United States Patent [19]

Blow et al.

[11] Patent Number: 5,473,712
[45] Date of Patent: Dec. 5, 1995

[54] OPTICALLY CONTROLLED OPTICAL SWITCH

[75] Inventors: Keith J. Blow, Suffolk; Nicholas J. Doran, Warwickshire, both of England

[73] Assignee: British Telecommunications plc, London, England

[21] Appl. No.: 66,139

[22] PCT Filed: Nov. 27, 1991

[86] PCT No.: PCT/GB91/02091

§ 371 Date: Jul. 26, 1993

§ 102(e) Date: Jul. 26, 1993

[87] PCT Pub. No.: WO92/09916

PCT Pub. Date: Jun. 11, 1992

[30] Foreign Application Priority Data

Nov. 27, 1990 [GB] United Kingdom .................. 9025793

[51] Int. Cl.$^6$ ................................................ G01C 19/72
[52] U.S. Cl. ........................ 385/16; 356/350; 250/227.27
[58] Field of Search .................................. 356/350, 345, 356/351; 385/14, 16; 372/32; 250/227.27

[56] References Cited

U.S. PATENT DOCUMENTS

| | | | |
|---|---|---|---|
| 4,280,766 | 7/1981 | Goss et al. | 356/350 |
| 4,704,031 | 11/1987 | Ulrich et al. | 356/350 |
| 5,137,356 | 8/1992 | Malvern | 356/350 |
| 5,137,357 | 8/1992 | Ferrar et al. | 372/94 |

OTHER PUBLICATIONS

Optics Letters, vol. 15, No. 4, 15 Feb. 1990, New York, pp. 248–250; K. J. Blow et al., "Two–Wavelength Operation of the Nonlinear Fiber Loop Mirror."
IEEE Photonics Technology Letters, vol. 2, No. 5, May 1990, New York, pp. 349–351; M. Jinno et al., "Ultrafast, Low Power, and Highly Stable All–Optical Switching in an All Polarization Maintaining Fiber Sagnac Interferometer."
"Soliton Logic Elements for All–Optical Processing", N. J. Doran, K. J. Blow and David Wood, SPIE vol. 836 Optoelectronic Materials, Devices, Packaging and Interconnects (1987), pp. 238–243 No Month.
"Experimental Demonstration of Optical Soliton Switching in an All–Fiber Nonlinear Sagnac Interferometer", K. J. Blow, N. J. Doran and B. K. Nayar, Optic Letters, vol. 14, No. 14, Jul. 15, 1989, pp. 754–756.
"Demonstration of the Nonlinear Fibre Loop Mirror as an Ultrafast All–Optical Demultiplexer", K. J. Blow, N. J. Doran and B. P. Nelson, Electronic Letters, vol. 26, No. 14, Jul. 5, 1990, pp. 962–964.
"All–Optical Switching in Nonlinear Fiber Loop Mirror Devices", B. K. Nayar, K. J. Blow and N. J. Doran, Optical Computing and Processing, 1991, vol. 1, No. 1, pp. 81–89 No Month.
"All–Optical Gbit/s Switching Using Nonlinear Optical Loop Mirror", B. P. Nelson, K. J. Blow, P. D. Constantine, N. J. Doran, J. K. Lucek, I. W. Marshall and K. Smith, Electronic Letters, vol. 27, No. 9, Apr. 25, 1991, pp. 704–705.
"Optical–Intensity Dependent Switching Using Soliton Self–Frequency Shift", J. K. Lucek and K. J. Blow, Electronic Letters, vol. 27, No. 10, May 9, 1991, pp. 882–884.

*Primary Examiner*—Akm E. Ullah
*Attorney, Agent, or Firm*—Nixon & Vanderhye

[57] ABSTRACT

An optical switch comprises an optical fibre Sagnac loop interferometer having an input port and an output port. A source of optical signals at 1.53 µm is coupled to the input port and a source of control optical signals of wavelengths 1.30 µm and 1.31 µm are coupled to the interferometer by a dichroic coupler. The coupler splits the 1.53 µm input optical signal into two signal portions which counterpropagate round the loop and couples the control signal to propagate in one direction only round the loop. The phase difference between the signal portions at the output port is dependent on the intensity of the control optical signal when they recombine at the coupler. The optical control signals are formed by combining at least two optical pulse streams, the pulses of distinct optical pulse streams being non-interferometric, to provide a logical AND gate.

12 Claims, 2 Drawing Sheets

OPTICALLY CONTROLLED OPTICAL SWITCH

This invention relates to optical interferometers and in particular, but not exclusively, to a method of using optical interferometers and optical switches including interferometers.

BACKGROUND OF THE INVENTION

Optical interferometers have found application as all-optical switches. In one such device an optical signal at a first wavelength is coupled to an input port of the interferometer which signal is split into two signal portions which later combine to provide an output signal at an output port. The intensity of the output signal is dependant on the relative phase difference between the portions when they combine. A control optical signal is coupled to the interferometer such that the phase difference between the signal portions at the output port, and hence the intensity of the output signal, is dependant on the intensity of the control optical signal.

An example of such optical switching is described in the applicant's co-pending patent application GB8920913.4. The interferometer is configured as a Sagnac loop fabricated from an optical fibre which exhibits a non-linearity, ie. its refractive index varies with the intensity of the optical signal. A cw optical source provides a cw optical signal at the first wavelength which is coupled to the input port which is split into two counter-propagating portions. A control signal at a second wavelength, in this case a received optical data signal, is coupled to the loop so that it propagates along the fibre loop in substantially one direction only.

For a zero intensity data optical signal the first optical fibre coupler and the optical fibre, which form a Sagnac antiresonant interferometer, act as a fibre loop mirror to the cw probe optical signal in that the signal entering the coupler at a first port will be reflected, i.e. it will exit from that same port. This is because the two counter-propagating portions maintain the same relative phase. When an additional optical signal is propagated along a non-linear interaction section of the loop, a phase shift is induced in that first portion of the optical signal which co-propagates with it, the condition for reflection is broken and some of the probe optical signal will exit the second port.

Other configurations of interferometer may be used, for example Mach-Zehnder interferometers. The Sagnac loop has the advantage that the counter-propagating signals transverse the same fibre but has the disadvantage that it is a two-port device. This disadvantage can be overcome by using the four-port Mach-Zehnder, for example.

Other forms of loop interferometer are known, for example waveguide loops fabricated in planar substrates. These can also be used to for non-linear interferometers for use as optical switches.

SUMMARY OF THE INVENTION

According to a first aspect of the present invention a method of using an interferometer having an input port and an output port and in which an optical signal at a first wavelength coupled to the input port is split into two signal portions which later combine to provide an output signal at the output port having an intensity dependant on the phase difference between the portions when they combine, and in which a control optical signal is also coupled to the interferometer such that the phase difference between the signal portions at the output port is dependant on the intensity of the control optical signal, is characterised in that the optical control signal is formed by combining at least two optical pulse streams, the pulses of distinct optical pulse streams being non-interferometric.

The pulses may be non-interferometric because the have different wavelengths, for example, or are spatially separated as they propagate through the interferometer. In general, pulses in the two wavelength bands will have different group delays so the control pulses will pass over the switched pulse during co-propagation round the waveguide loop.

The present invention provides a method of switching the optical signal at the first wavelength dependant on the combined intensities of the optical pulse streams, i.e. it provides logic switching. Further, the use of non-interferometric pulses provides switching without the need for interferometric alignment of the control pulse streams.

According to a second aspect of the present invention an optical switch comprising an interferometer has an input port and an output port; a source of optical signals at a first wavelength coupled to the input port; an optical coupling means for splitting an input optical signal into two signal portions; an optical combining means for combining the two signal portions to provide an output signal at the output port having an intensity dependant on the phase difference between the two portions when they combine; a source of control optical signals coupled to the interferometer such that the phase difference between the signal portions at the output port is dependant on the intensity of the control optical signals; and is characterised in that means are provided for combining at least two optical pulse streams to constitute the source of optical control signals, the pulses of distinct optical pulse streams being non-interferometric.

An embodiment of the present invention will now be described, by way of example only, with reference to the accompanying drawings of which:

DESCRIPTION OF THE PREFERRED EMBODIMENTS

Figure 1:
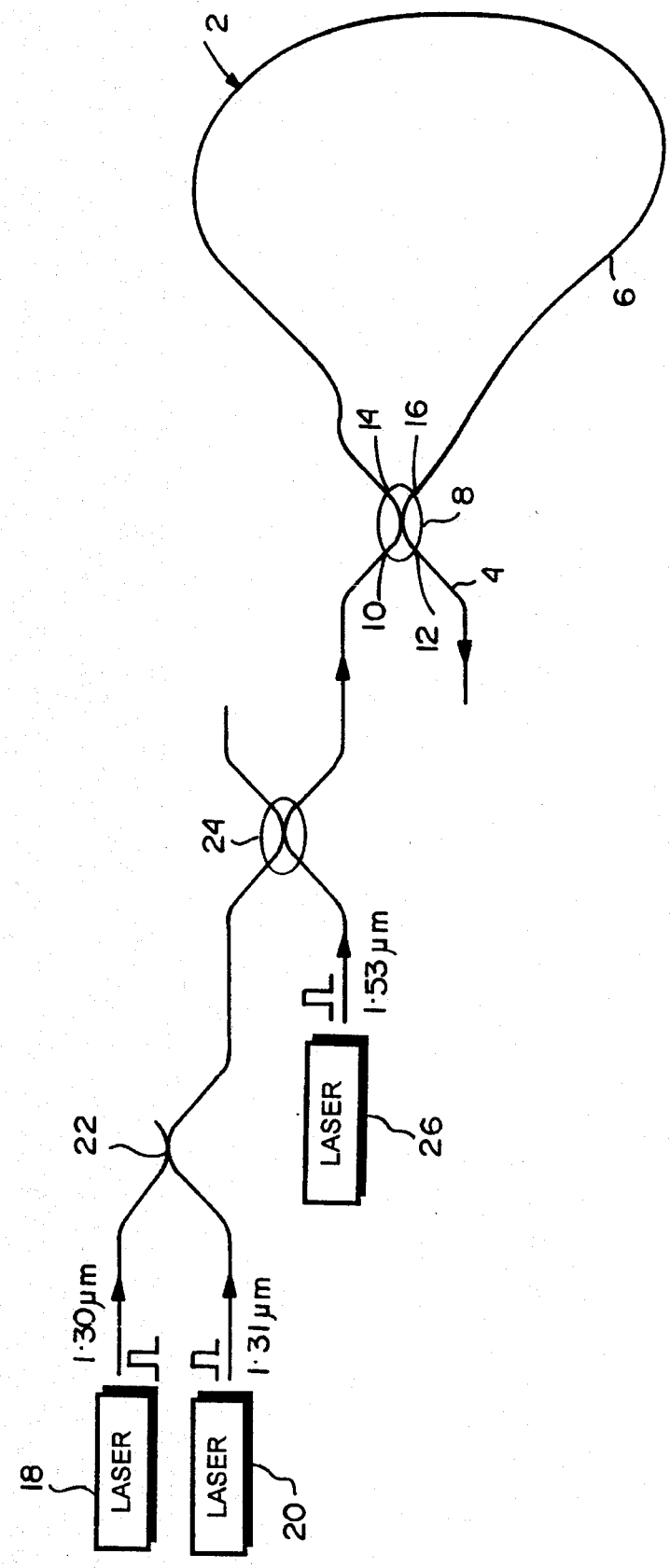
FIGS. 1 and 2 are schematic diagrams of a first and a second embodiment of the present invention, respectively.

Referring to FIG. 1, a Sagnac anti-resonant interferometer 2 is defined by a signal silica optical fibre 4 formed into an optical fibre loop 6 with portions of the optical fibre being formed into a fused optical fibre coupler 8 having a first pair of ports 10, 12 and a second pair of ports 14, 16. The loop 6 exhibits a non-linear refractive index. The fibre loop 6 is 500 m long and polarisation maintaining. The port 10 constitutes an input port and the port 12 constitutes an output port of the interferometer 2.

Modelocked Nd:YAG lasers 18 and 20 provide pulsed optical signals of 130 ps pulse width at 1.30 µm and 1.31 µm which are combined by coupler 22 to form a control signal which is coupled into the first port 10 by means of a dichroic coupler 24. Other suitable combinations of wavelengths falling within the broadband coupling characteristics of the couplers 8, 22 and 24 could be used.

A further modelocked Nd:YAG laser 26 provides optical signals of 130 ps pulse width at 1.53 µm which is also coupled to the port 10 of the coupler 8 by means of the optical coupler 24.

The coupler 8 is manufactured in a well known manner so as to couple equal portions of the 1.53 µm optical signal coupled to port 10 to the ports 14 and 16 to produce two counter-propagating, equal intensity portions in the loop 6 and to couple substantially all of the optical signals at 1.30 µm and 1.31 µm into port 14 (an extinction ratio of 37 dB at 1.3 μm) so the pulsed signal propagates in only one direction round loop 6. The coupler 24 is a dichroic coupler in which the 1.53 μm, 1.30 μm and 1.31 μm optical signals are combined.

The intensities of the pulses from lasers 18 and 20 are chosen such that the cross-phase modulation of each is sufficient to cause a 90° relative phase shift of the counterpropagating signal portions in the loop 6 by the time they recombine at the coupler 8. When both pulses are present there will be a 180° relative phase shift which results in complete switching. A single pulse or no pulse will result in no or only partial switching, respectively. In such an arrangement the interferometer of FIG. 1 acts as an AND gate with the 1.53 μm pulses being fully switched only if pulses at 1.30 μm and 1.31 μm are both present.

Other wavelengths may be used as convenient to match the properties of the interferometer.

If the pulse stream output of FIG. 1, at 1.53 μm, is to be combined, logically, with another optical pulse stream, the next interferometer will need to be configured such that the other optical pulse stream is at a different frequency, e.g. 1.54 μm, and that these two data streams, when combined, act as a control signal to switch a further data stream in the 1.3 μm window of the interferometer. Such a concatenation of stages will require optical amplifiers at both wavelength bands (here in the region of 1.30 μm and 1.53 μm) in order to maintain signal levels against losses in the fibre.

Figure 2:
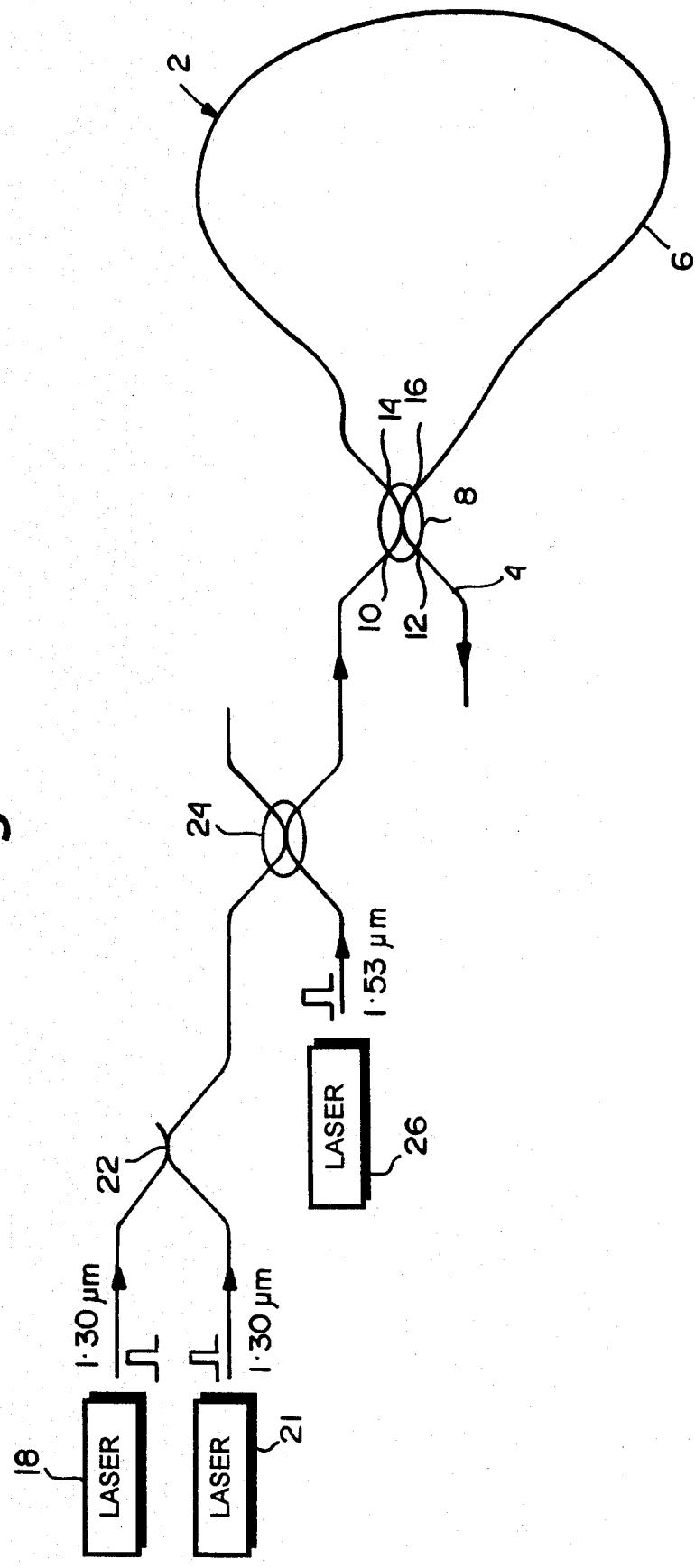

FIG. 2 shows an alternative embodiment of the present invention which is as shown in FIG. 1, with the same elements referenced by the same numerals, but in which the laser 20 of FIG. 1 is replaced with a laser 21 operating at the same frequency as laser 18, 1.30 μm. In this case, the optical pulses from the lasers are timed so that they do not overlap and so again are non-interferometric pulses.

The pulses from the lasers 18 and 21 are sufficiently close together that they can traverse across the same 1.53 μm pulse propagating round the loop 6 so that they can both effect cross-phase-modulation independently by passing the pulse to be switched.

These schemes may be extended by coupling further sources of optical pulse streams to the interferometer. By suitable fixing of their intensities and perhaps with the application of a further, constant, bias optical pulse stream or cw optical signal, one could obtain an intensity of output pulse signal at 1.53 μm which is approximately proportional to the number of pulses in the 1.3 μm band which cross-phase-modulates that 1.53 μm pulse.

We claim:

1. A method of using an interferometer having an input port and an output port and in which an optical signal at a first wavelength coupled to the input port is split into two signal portions which later combine to provide an output signal at the output port having an intensity dependent on the phase difference between the signal portions when they combine, in which a control optical signal is also coupled to the interferometer such that the phase difference between the signal portions at the output port is dependent on the intensity of the control optical signal, is characterised by forming the optical control signal by combining at least two optical pulse streams, the pulses of distinct optical pulse streams being non-interferometric.

2. A method as claimed in claim 1, in which the optical pulses of distinct optical streams are of different wavelengths.

3. A method as claimed in claim 1, in which the pulses of distinct optical streams do not overlap when combined to form the optical control signal.

4. An optical switch comprising an interferometer having:
an input port and an output port;
a source of optical signals at a first wavelength coupled to the input port;
an optical coupling means for splitting an input optical signal into two signal portions and
for combining the two signal portions at the output port to provide an output signal having an intensity dependant on the phase difference between the two portions when they combine;
a source of control optical signals coupled to the interferometer such that the phase difference between the signal portions at the output port is dependant on the intensity of the control optical signals; characterised in that means are provided for combining at least two optical pulse streams to constitute the source of optical control signals, the pulses of distinct optical pulse streams being non-interferometric.

5. An optical switch as claimed in claim 4, in which additional optical sources provide the optical pulses of distinct optical streams at different wavelengths.

6. An optical switch as claimed in claim 4, in which additional optical sources operating at the same wavelength provide the optical pulses of distinct optical streams in such a manner that they do not overlap when combined to form the optical control signals.

7. An optical switch as claimed in claim 4, in which the interferometer comprises a Sagnac loop interferometer.

8. An optical switch as claimed in claim 7, in which the interferometer comprises an optical fibre loop interferometer.

9. An optical switch as claimed in claim 8, in which the optical fibre is a silica-based optical fibre.

10. An AND gate comprising:
an optical fiber loop interferometer;
an optical coupler for receiving and splitting an optical input signal into two signal portions, counterpropagating the two signal portions around the fiber loop, combining the two signal portions having propagated around the fiber loop and providing at an output port an optical output signal having an intensity dependent on the phase difference between the two signal portions when combined;
means for providing an optical input signal at the input port of said optical coupler;
means for providing a first optical pulse stream;
means for providing a second optical pulse stream;
the pulses of said first and second pulse streams being non-interferometric;
means for combining said first and second pulse streams and applying them to the input port of said optical coupler; and
whereby when both said first optical pulse stream and said second optical pulse stream are present the output signal at said optical output port will be fully switched.

11. The AND gate of claim 10, wherein the optical pulses of the first optical pulse stream and the second optical pulse stream have different wavelengths.

12. The AND gate of claim 10, wherein the optical pulses of the first optical pulse stream and the second optical pulse stream have the same wavelength and are spatially separated.

* * * * *